US009558234B1

(12) United States Patent
Lifantsev (10) Patent No.: US 9,558,234 B1
(45) Date of Patent: Jan. 31, 2017

(54) AUTOMATIC METADATA IDENTIFICATION

(71) Applicant: GOOGLE INC., Mountain View, CA (US)

(72) Inventor: Maxim Lifantsev, Mountain View, CA (US)

(73) Assignee: Google Inc., Mountain View, CA (US)

(*) Notice: Subject to any disclaimer, the term of this patent is extended or adjusted under 35 U.S.C. 154(b) by 311 days.

(21) Appl. No.: 13/947,582

(22) Filed: Jul. 22, 2013

Related U.S. Application Data

(63) Continuation of application No. 10/952,445, filed on Sep. 29, 2004, now Pat. No. 8,495,061.

(51) Int. Cl.
*G06F 17/30* (2006.01)

(52) U.S. Cl.
CPC ... *G06F 17/30386* (2013.01); *G06F 17/30864* (2013.01)

(58) Field of Classification Search
CPC .............................................. G06F 17/30864
USPC ............... 707/713, 722, 728, 729, 730, 731, 736,707/999.001–999.006; 382/173; 709/217
See application file for complete search history.

(56) References Cited

U.S. PATENT DOCUMENTS

| 5,299,026 | A | 3/1994 | Vincett et al. | |
|---|---|---|---|---|
| 6,044,375 | A | 3/2000 | Shmueli et al. | |
| 6,047,291 | A | 4/2000 | Anderson et al. | |
| 6,055,543 | A | 4/2000 | Christensen et al. | |
| 6,311,214 | B1 | 10/2001 | Rhoads | |
| 6,418,448 | B1 | 7/2002 | Sarkar | |
| 6,651,059 | B1 | 11/2003 | Sundaresan et al. | |
| 6,859,803 | B2 | 2/2005 | Dagtas et al. | |
| 7,536,561 | B2* | 5/2009 | Warnock et al. | 713/193 |
| 7,885,987 | B1* | 2/2011 | Lee | 707/923 |
| 8,495,061 | B1 | 7/2013 | Lifantsev | |
| 2003/0028503 | A1 | 2/2003 | Giuffrida et al. | |
| 2003/0208502 | A1 | 11/2003 | Lin | |
| 2004/0199547 | A1 | 10/2004 | Winter et al. | |
| 2004/0267721 | A1 | 12/2004 | Meyerzon et al. | |
| 2005/0041860 | A1 | 2/2005 | Jager | |
| 2006/0023945 | A1* | 2/2006 | King et al. | 382/173 |
| 2006/0036934 | A1* | 2/2006 | Fujiwara | 715/500 |

* cited by examiner

*Primary Examiner* — Syling Yen
(74) *Attorney, Agent, or Firm* — Fenwick & West LLP (57) ABSTRACT

A system determines whether text of a document includes a document identifier and uses the document identifier to locate metadata in a database when the text of the document includes the document identifier. The system compares the metadata to the text of the document and associates the metadata with the text of the document when at least some of the metadata matches the text of the document.

20 Claims, 8 Drawing Sheets

AUTOMATIC METADATA IDENTIFICATION

RELATED APPLICATION

This application is a continuation of U.S. patent application Ser. No. 10/952,445 filed Sep. 29, 2004, now U.S. Pat. No. 8,495,061, the entire content of which is incorporated herein by reference.

BACKGROUND

Field of the Invention

Systems and methods consistent with the principles of the invention relate generally to information retrieval and, more particularly, to the identification of metadata associated with a set of documents.

Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

It is sometimes useful to associate other information, such as categorization, title, author, publisher, and publication date, with the scanned documents. Currently, skilled researchers manually enter this information based on examining the original document.

SUMMARY

According to one aspect, a method may include determining whether text of a document includes a document identifier and using the document identifier to locate metadata in a database when the text of the document includes the document identifier. The method may also include comparing the metadata to the text of the document and associating the metadata with the text of the document when at least some of the metadata matches the text of the document.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

More and more types of documents are becoming searchable via search engines. For example, some documents, such as books, magazines, and/or catalogs, may be scanned and their text recognized via OCR. It is beneficial to understand more about these documents and make this additional information also searchable.

Systems and methods consistent with the principles of the invention may automatically identify metadata associated with a document based on basic metadata (e.g., title, author, publisher, etc.) and create an association between the metadata and the scanned and/or text version of the document, making both the document and its associated metadata searchable. Accordingly, through basic metadata corresponding to a document, various other kinds of additional existing metadata corresponding to the document may be identified and associated with the document.

Exemplary System

Figure 1:
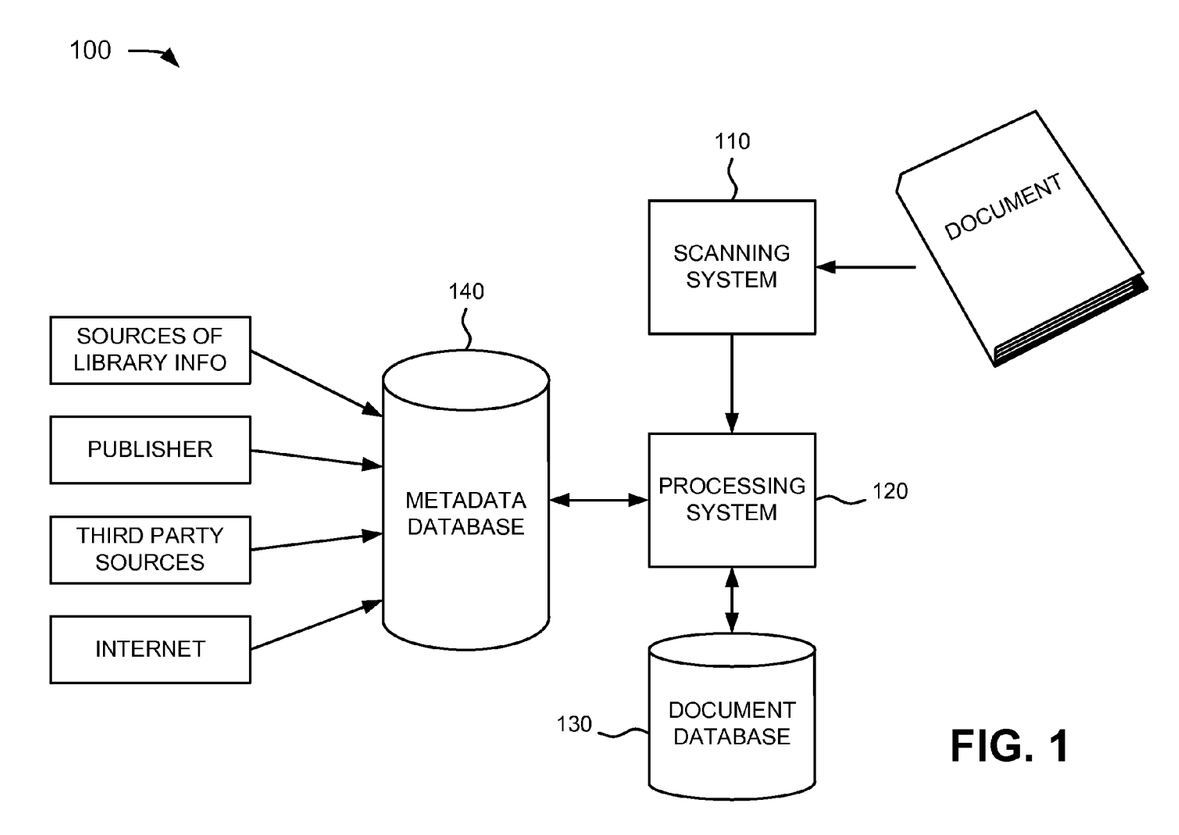
FIG. 1 is a diagram of an exemplary system in which systems and methods consistent with the principles of the invention may be implemented.

FIG. 1 is a diagram of an exemplary system 100 in which systems and methods consistent with the principles of the invention may be implemented. System 100 may include scanning system 110, processing system 120, document database 130, and metadata database 140. Scanning system 110 may scan the pages of a document and perform OCR on the scanned pages to recognize the text associated with the document. Scanning system 110 may use conventional techniques for scanning and performing OCR.

Processing system 120 may store the scanned image and document text in document database 130. As described in more detail below, processing system 120 may identify metadata in metadata database 140 that corresponds to the document and link (or otherwise associate) the metadata and the document image and/or text.

Document database 130 may store the image and text associated with a document. In one implementation, document database 130 may store a link to the metadata in metadata database 140 that corresponds to the document image and text.

Metadata database 140 may store metadata corresponding to documents. Metadata may generally be defined as information obtained separate from the scanning process. The metadata associated with a document may originate from a number of sources, such as sources of library information, a publisher, third party sources, and the Internet. The sources of library information may provide various information regarding a document, such as a title, a list of authors, a list of editors, a publisher, keywords, a number of pages, a subject classification, a publication date, a Library of Congress cataloging number, a digital object identifier (DOI), an International Standard Book Number (ISBN), and/or an International Standard Serial Number (ISSN). Examples of sources of library information may include libraries and organizations, such as the Online Computer Library Center (OCLC) and the Research Libraries Group (RLG). A publisher may also provide information regarding a document, such as the full text of the back cover, the flaps, and/or the table of contents of the document, sales statistics, and/or readership statistics.

Third party sources may provide information regarding a document, such as a first chapter excerpt or other information regarding a document, possibly including information identified above as being provided by the sources of library information or the publisher. Examples of third party sources include Ingram Book Company, Baker and Taylor, and Dial-A-Book (a company that sells excerpts of first chapters of documents). The Internet may be another source of information regarding a document. Information gathered from the Internet regarding a document may include information regarding web documents relating to the document or the author of the document.

Metadata database 140 may store a document's metadata in a record. In one implementation, the records of metadata database 140 are arranged to form a relational database. A key in a relational database is a field or a combination of fields that uniquely identify a record or reference another record. In one implementation, a document identifier, such as an ISBN, ISSN, and/or DOI, may be used as a key to uniquely identify a record within metadata database 140.

Figure 2:
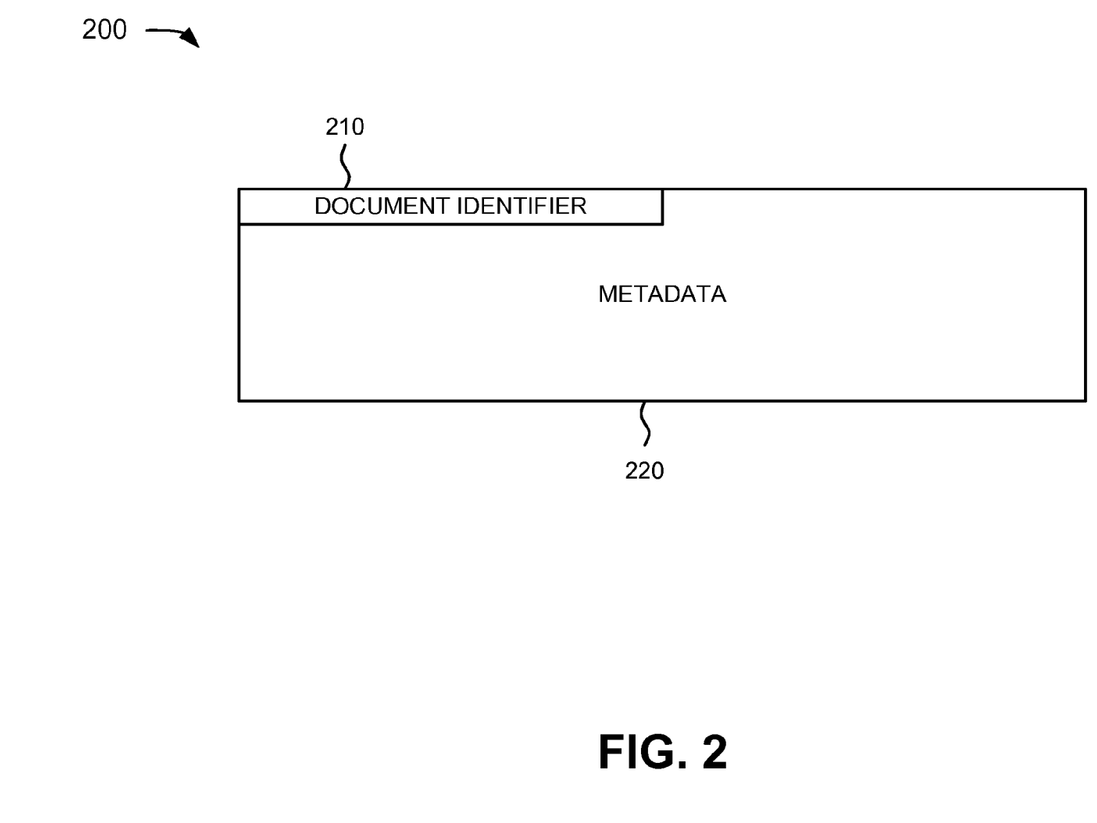
FIG. 2 is an exemplary diagram of a record within the metadata database of FIG. 1 according to an implementation consistent with the principles of the invention.

FIG. 2 is an exemplary diagram of a record 200 within metadata database 140 according to an implementation consistent with the principles of the invention. Record 200 may include a number of fields, such as a document identifier field 210 and metadata field(s) 220. Document identifier field 210 may store a document identifier that may (alone or in combination with other types of data) uniquely identify a document. Examples of document identifiers may include ISBNs, ISSNs, and DOIs.

Metadata field(s) 220 may store information, such as the information provided by the various sources described above. In some instances, the information in metadata field(s) 220 may correspond to a single document. In other instances, the information in metadata field(s) 220 may correspond to multiple documents (e.g., documents corresponding to conference proceedings or a series of conference proceedings). In these latter instances, other information, such as a volume number or issue number, may be used to identify metadata associated with a particular document within record 200.

In an alternate implementation, the document image and/or text may be stored in another location within metadata database 140 and linked to its associated metadata within metadata database 140. In yet another implementation, the actual document image and/or text may be stored in the same record as its associated metadata. In either of these implementations, document database 130 may be unnecessary.

Exemplary Processing System/Scanning System Architecture

Figure 3:
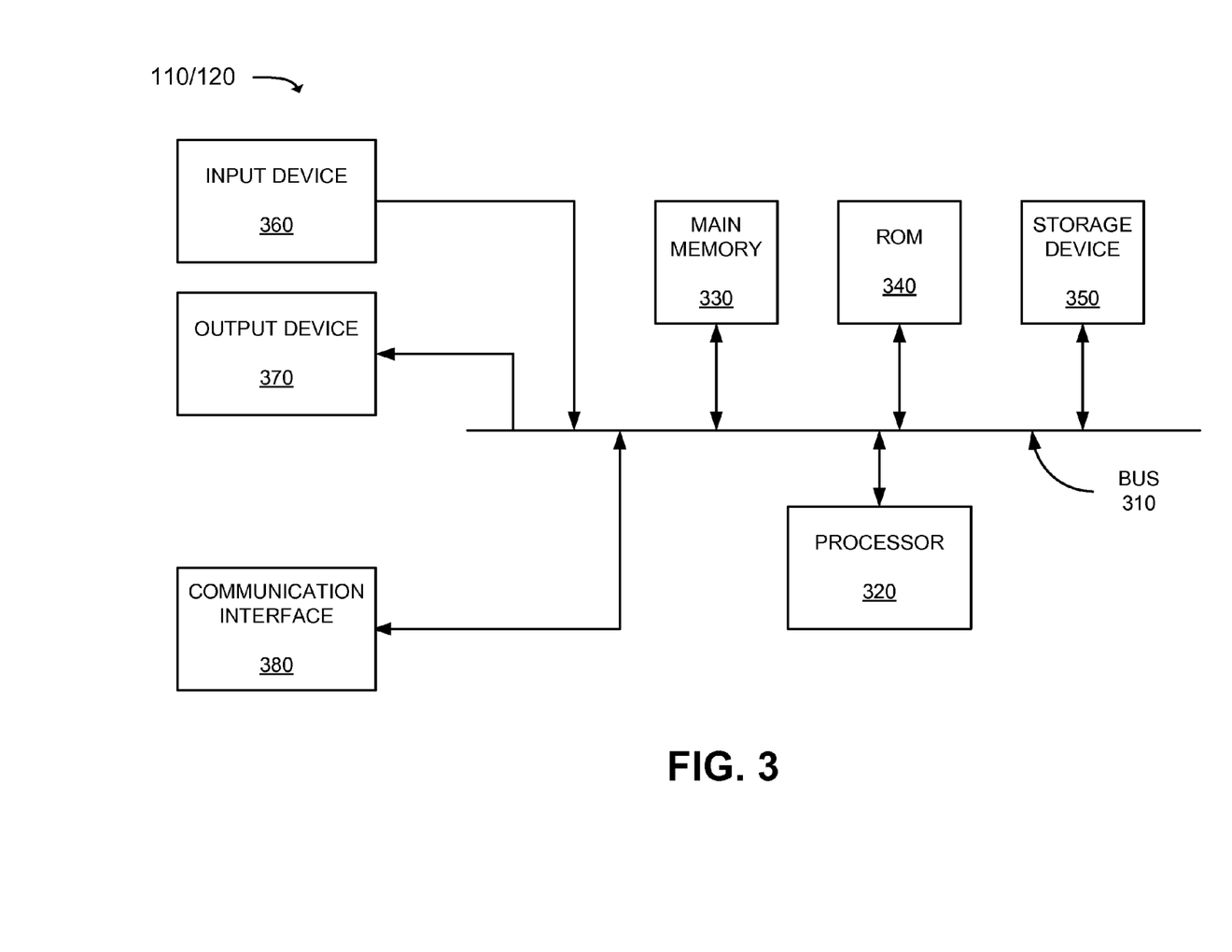
FIG. 3 is an exemplary diagram of the processing system and/or scanning system of FIG. 1 according to an implementation consistent with the principles of the invention.

FIG. 3 is an exemplary diagram of processing system 120 and/or scanning system 110 ("system 110/120") according to an implementation consistent with the principles of the invention. In this implementation, system 110/120 may take the form of a computer. In another implementation, system 110/120 may include a set of cooperating computers.

As shown in FIG. 3, system 110/120 may include a bus 310, a processor 320, a main memory 330, a read only memory (ROM) 340, a storage device 350, an input device 360, an output device 370, and a communication interface 380. Bus 310 may include a path that permits communication among the elements of system 110/120.

Processor 320 may include a conventional processor, microprocessor, or processing logic that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits an operator to input information to system 110/120, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables system 110/120 to communicate with other devices and/or systems.

Exemplary Processing

Figure 4:
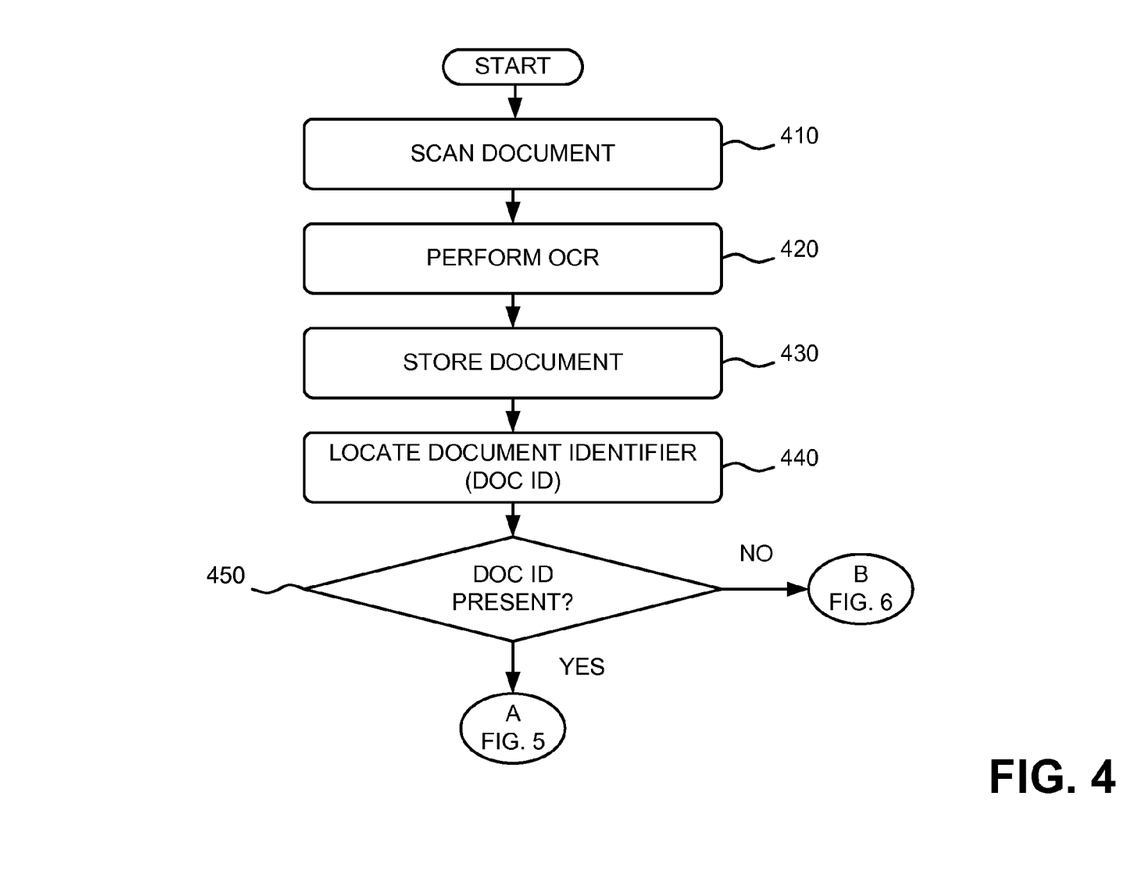
FIGS. 4-6 are flowcharts of exemplary processing for identifying metadata for and associating the metadata with a document according to an implementation consistent with the principles of the invention.
Figure 5:
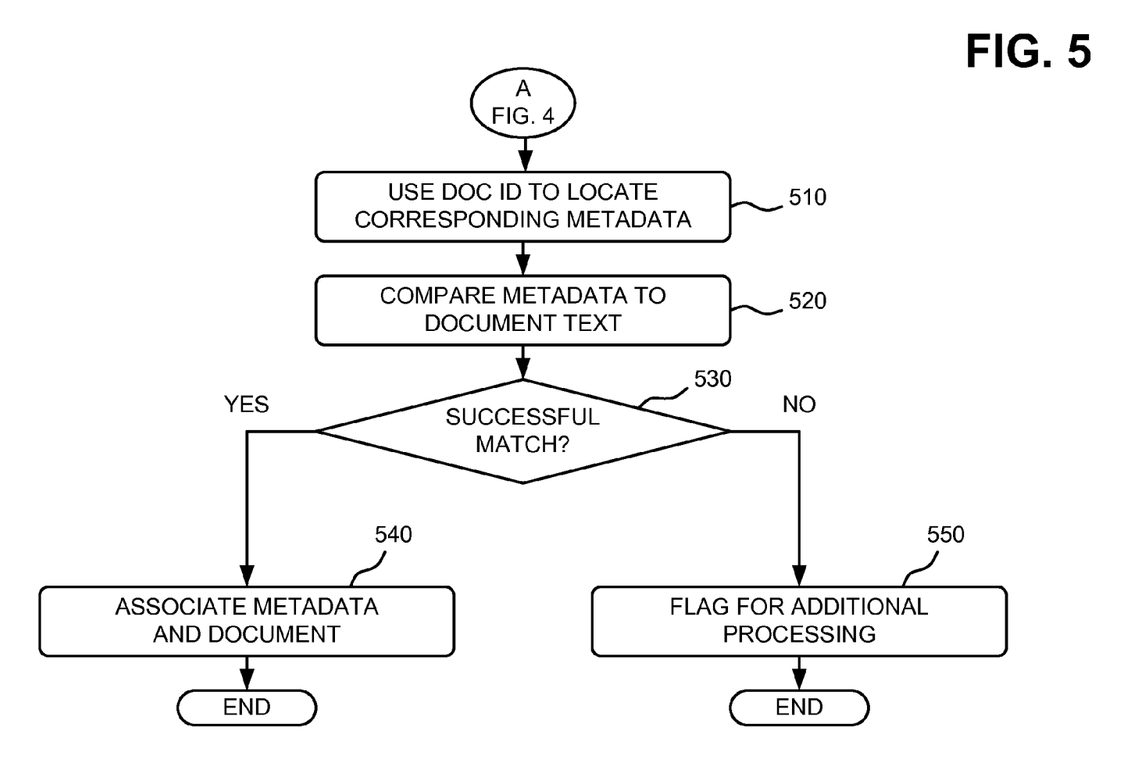
Figure 6:
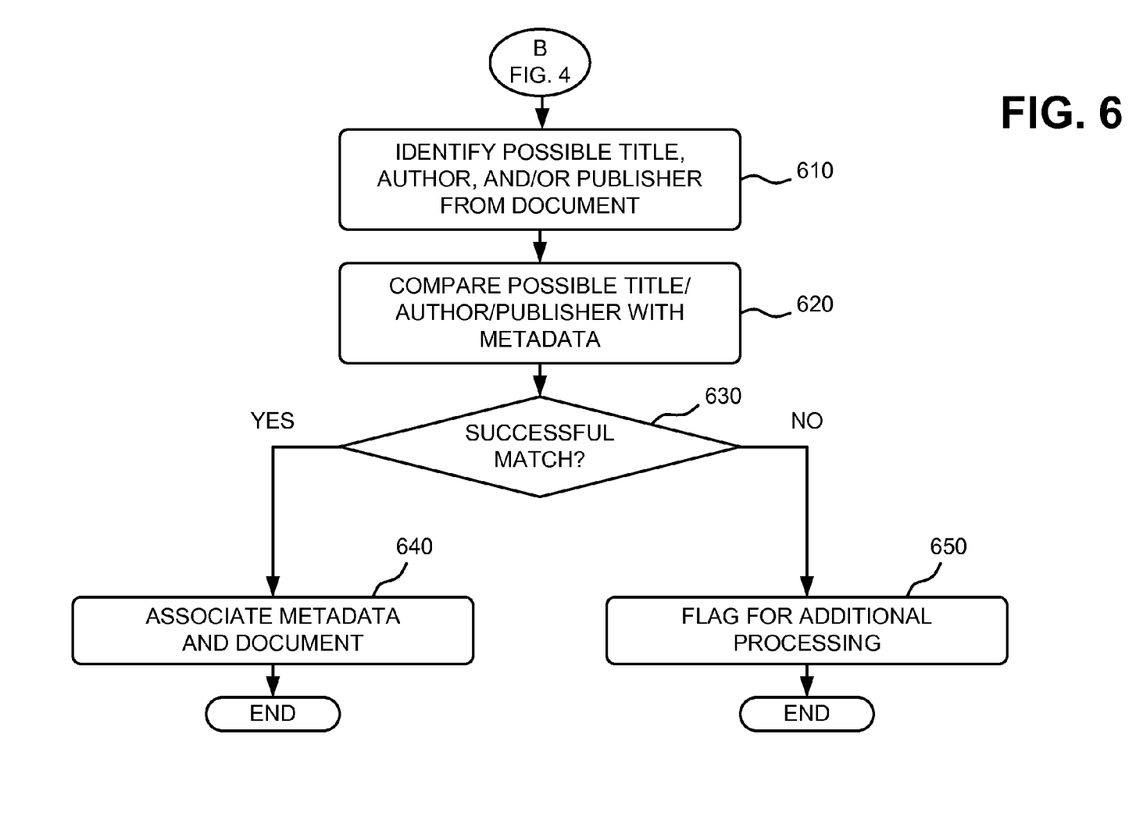

FIGS. 4-6 are flowcharts of exemplary processing for identifying metadata for and associating the metadata with a document according to an implementation consistent with the principles of the invention. Processing may begin with the scanning of a document (act 410) (FIG. 4). Conventional scanning techniques may be used to capture images of the pages of the document. OCR may then be performed on the images of the pages of the document (act 420). Conventional OCR techniques may be used to recognize the text in the document, characteristics of the text (e.g., font, size, etc.), and where the text lies on the pages based on the images of the pages of the document. The document images and/or text may then be stored either in document database 130 or metadata database 140 (act 430).

Figure 7:
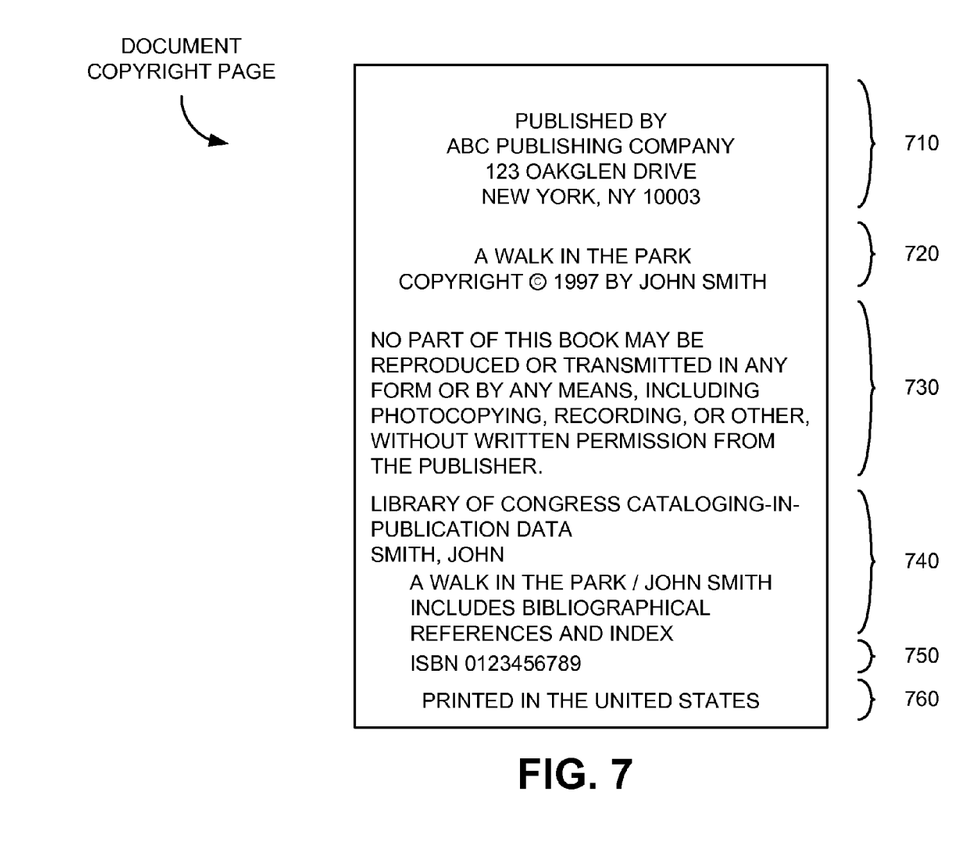
FIG. 7 is an exemplary diagram of a document copyright page.

A document identifier (e.g., an ISBN, ISSN, and/or DOI) associated with the document may be located within the document text (act 440). The document identifier may be located at a couple of different places within the document and the particular places may differ based on the type of document. For example, the document identifier may be located on a copyright page of the document. FIG. 7 is an exemplary diagram of a document copyright page. The copyright page typically includes information regarding the publisher of the document 710, the title, copyright date, and author of the document 720, a statement of rights regarding the document 730, a Library of Congress statement 740, an ISBN or ISSN 750, and a location of printing 760. Other copyright pages might include more, fewer, or different pieces of information.

To identify the copyright page of a document, the first several pages of the document may be analyzed. In one implementation, the first several pages of the document may be searched for the presence of a certain keyword, or keywords, that is indicative of the copyright page, such as "Library of Congress," "ISBN," or "ISSN." Alternatively or additionally, the pages may be searched for other information that is indicative of the copyright page, such as the copyright symbol (©), typical phrases of copyright statements, a "printed in" clause, or the presence of a date.

Once the copyright page has been identified (with some degree of certainty), the document identifier may be identified. An ISBN includes ten digits and is usually located shortly after the text "ISBN," or its unabbreviated version. An ISSN includes eight digits and is usually located shortly after the text "ISSN," or its unabbreviated version. Both ISBN and ISSN have built-in check digits that permit a significant percentage of other numbers of correct length to be easily discarded from consideration. Sometimes, the copyright page includes more than one instance of the same document identifier (e.g., ISBN or ISSN). This may assist in getting the correct document identifier in light of possible OCR errors.

Figure 8:
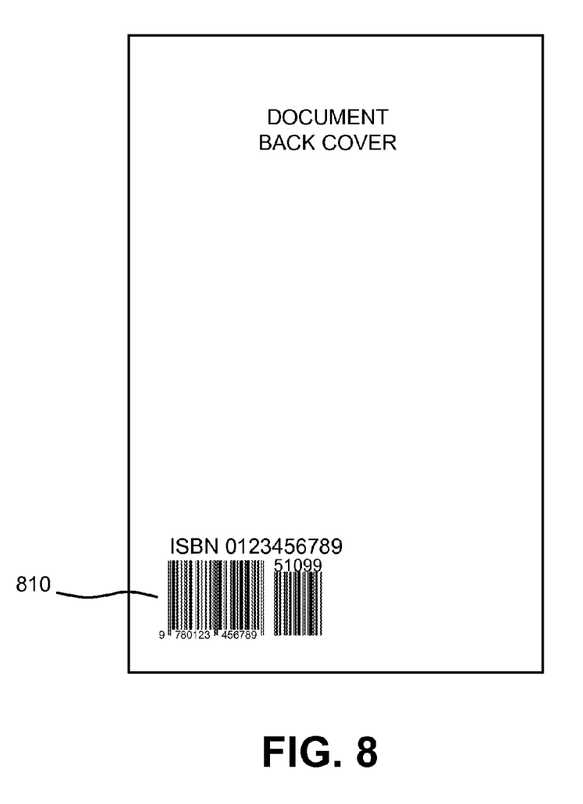
FIG. 8 is an exemplary diagram of a document back cover.

Alternatively or additionally, the document identifier may be located within a barcode associated with the document, such as on the back cover or inside the front or back cover of the document. FIG. 8 is an exemplary diagram of a document back cover. The document back cover may include, among other things, a barcode 810. Barcode 810 may encode certain pieces of information, including an ISBN or ISSN. As shown in FIG. 8, barcode 810 encodes the digits 978012345678951099. The "978" may indicate that this barcode is a bookland barcode; the "0123456789" corresponds to the ISBN; the "5" may represent a country code corresponding to the United States; and the "1099" may refer to the retail price of $10.99 for the document. In other implementations, barcode 810 may encode more, fewer, or different pieces of information.

In one implementation, the document identifier may be identified from both the copyright page and the barcode of the document. The document identifiers may then be compared to determine whether they match. A match may indicate that the correct document identifier has been located. When they do not match, the document identifier from the barcode may be used over the document identifier from the copyright page because it is not uncommon for a copyright page to include more than one document identifier for different editions, bindings, or versions of the document.

If the document identifier has been successfully located (act 450), then the document identifier may be used to locate a corresponding record in metadata database 140 (act 510) (FIG. 5). For example, metadata database 140 may be searched to identify a record that includes the document identifier as a key. In some instances, additional information, such as a volume number or issue number (either obtained automatically or manually), may be used to identify the metadata associated with a document within the identified record. In another implementation, the metadata association may be more complex than linking one existing record in metadata database 140 with a document. For example, based on document identifiers (e.g., ISSN, ISBN, and series number) parsed from the document, several metadata records from metadata database 140 may be identified and merged into a more complete record for this specific document that did not explicitly exist before in metadata database 140 and which may be different from simply the union of the records from which it is created.

In one implementation, basic metadata from the record may be compared to the text of the document to make sure that the correct metadata has been identified (act 520). For example, the title of the document with which the metadata is associated, the name of the author associated with this document, and/or the name of the publisher associated with this document, as retrieved from metadata database 140, may be respectively compared to the possible title, name of the author, and/or name of the publisher within the document text to determine whether there is a match.

The title, name of the author, and name of the publisher within the document text has been labeled as "possible" because this information may be determined to a degree of certainty, though sometimes less than absolute certainty due to possible OCR errors, extraction errors, and formatting differences. As mentioned above, the scanning process may determine the text in the document, characteristics of the text (e.g., font, size, etc.), and where the text lies on the page. Based on this information and information about the typical layout of a document, information, such as the title of the document, the name of the author, and the name of the publisher, can be determined.

While the title of the document, the name of the author, and/or the name of the publisher may be used to match with metadata in metadata database 140, more, fewer, or different pieces of information may be used in other implementations consistent with the principles of the invention. For a match to be successful, it may be required that all of the pieces of information match or that some percentage of them match.

If the match is successful (act 530), then the metadata may be associated with the document image and/or text (act 540). In one implementation, the association may include storing a link to the metadata in document database 130. In another implementation, the association may include storing the document image and/or text in the record that contains the metadata (or elsewhere) in metadata database 140.

If a comparison of the metadata and the document text results in an unsuccessful match (act 530), then the document may be flagged for additional processing (act 550). In one implementation, the additional processing might entail manual identification of the document identifier or manual identification of the metadata in metadata database 140 that corresponds to the document.

If the document identifier has not been successfully located (act 450) (FIG. 4), such as in the case where the document does not include a document identifier, then the possible title of the document, name of the author, and/or name of the publisher may be identified within the document text (act 610) (FIG. 6). As mentioned above, the scanning process may determine the text in the document, characteristics of the text (e.g., font, size, etc.), and where the text lies on the page. Based on this information and information about the typical layout of a document, information, such as the title of the document, the name of the author, and the name of the publisher, can be determined with some degree of certainty.

The possible title of the document, name of the author, and/or name of the publisher may be compared to author names, publisher names, and/or titles within the metadata in metadata database 140 (act 620). For a match to be successful, it may be required that all of the pieces of information match or that some percentage of them match.

If the match is successful (act 630), then the metadata may be associated with the document image and/or text (act 640). As mentioned above, the association may include storing a link to the metadata in document database 130. In another implementation, the association may include storing the document image and/or text in the record with the metadata (or elsewhere) in metadata database 140.

If a comparison of the metadata and the document text results in an unsuccessful match (act 630), then the document may be flagged for additional processing (act 650). In one implementation, the additional processing might entail manual identification of the document identifier or manual identification of the metadata in metadata database 140 that corresponds to the document.

Once a document's metadata has been associated with its image and/or text, all of this information may be available to users for keyword searching and result presentation and to further processing that can now benefit from the availability of structured metadata for the document.

CONCLUSION

Systems and methods consistent with the principles of the invention may automatically identify metadata associated with a document and create an association between the metadata and the image and/or text version of the document, making both the document content and its associated metadata available for searching or other processing.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method of identifying metadata for a document, comprising:
    accessing a document text of the document, the document text produced by performing optical character recognition on scanned images of pages of the document;
    locating an identifier of the document included within the document text of the document, locating the identifier comprising:
        analyzing a subset of the pages of the document to determine whether an identifier of the document is present in the subset of pages; and
        responsive to the analysis determining that the identifier of the document is present, identifying the identifier of the document;
    identifying metadata in an external data structure separate from the document text using the identifier, the external data structure storing metadata corresponding to a plurality of documents;
    comparing the metadata to the document, the comparing comprising:
        analyzing the document text of the document and a layout of the document to determine information about the document; and
        comparing the information about the document to the metadata to determine whether the information and metadata match; and
    responsive to the comparing of the metadata to the document, performing one of:
        if the comparing indicates that the information and the metadata match, associating the metadata with the document; and
        if the comparing indicates that the information and the metadata do not match, storing an indication that additional processing is needed, where the additional processing includes manual identification of the document identifier or manual identification of the metadata.

2. The method of claim 1, wherein locating an identifier of the document comprises finding an International Standard Book Number (ISBN) in the document.

3. The method of claim 2, wherein locating an identifier of the document further comprises:
    locating a barcode in the document;
    determining whether the barcode matches the ISBN; and
    responsive to determining that the barcode matches the ISBN, indicating that the correct identifier has been located.

4. The method of claim 1, further comprising making the information about the document available for keyword searching responsive to the comparing of the information about the document to the metadata indicating that the information and the metadata match.

5. The method of claim 1, wherein comparing the metadata to the document further comprises comparing at least one of a title, a name of author, or a name of publisher.

6. The method of claim 1, wherein identifying metadata in an external data structure comprises:
    accessing a metadata database storing information regarding the plurality of documents gathered from a plurality of sources.

7. The method of claim 1, where analyzing the document text of the document and a layout of the document includes at least one of:
    comparing a title associated with the metadata to a title of the document;
    comparing information regarding an author associated with the metadata to information regarding an author of the document; and
    comparing information regarding a name of a publisher associated with the metadata to information regarding a name of a publisher of the document.

8. A non-transitory computer readable storage medium storing instructions executable by a computer processor to cause the processor to identify metadata for a document by performing steps comprising:
    accessing a document text of the document, the document text produced by performing optical character recognition on scanned images of pages of the document;
    locating an identifier of the document included within the document text of the document, locating the identifier comprising:
        analyzing a subset of the pages of the document to determine whether an identifier of the document is present in the subset of pages; and responsive to the analysis determining that the identifier of the document is present, identifying the identifier of the document;

identifying metadata in an external data structure separate from the document text using the identifier, the external data structure storing metadata corresponding to a plurality of documents;

comparing the metadata to the document, the comparing comprising:

analyzing the document text of the document and a layout of the document to determine information about the document; and comparing the information about the document to the metadata to determine whether the information and metadata match; and responsive to the comparing of the metadata to the document, performing one of:

if the comparing indicates that the information and the metadata match, associating the metadata with the document; and if the comparing indicates that the information and the metadata do not match, storing an indication that additional processing is needed, where the additional processing includes manual identification of the document identifier or manual identification of the metadata.

9. The computer readable storage medium of claim 8, wherein locating an identifier of the document comprises finding an International Standard Book Number (ISBN) in the document.

10. The computer readable storage medium of claim 9, wherein locating an identifier of the document further comprises:

locating a barcode in the document;

determining whether the barcode matches the ISBN; and responsive to determining that the barcode matches the ISBN, indicating that the correct identifier has been located.

11. The computer readable storage medium of claim 8, further comprising making the information about the document available for keyword searching responsive to the comparing of the information about the document to the metadata indicating that the information and the metadata match.

12. The computer readable storage medium of claim 8, wherein comparing the metadata to the document further comprises comparing at least one of a title, a name of author, or a name of publisher.

13. The computer readable storage medium of claim 8, wherein identifying metadata in an external data structure comprises:

accessing a metadata database storing information regarding the plurality of documents gathered from a plurality of sources.

14. The computer readable storage medium of claim 8, where analyzing the document text of the document and a layout of the document includes at least one of:

comparing a title associated with the metadata to a title of the document;

comparing information regarding an author associated with the metadata to information regarding an author of the document; and comparing information regarding a name of a publisher associated with the metadata to information regarding a name of a publisher of the document.

15. A system for identifying metadata for a document, comprising:

a computer processor adapted to execute computer program instructions; and a non-transitory computer-readable storage medium storing computer program instructions executable to perform steps comprising:

accessing a document text of the document, the document text produced by performing optical character recognition on scanned images of pages of the document;

locating an identifier of the document included within the document text of the document, locating the identifier comprising:

analyzing a subset of the pages of the document to determine whether an identifier of the document is present in the subset of pages; and responsive to the analysis determining that the identifier of the document is present, identifying the identifier of the document;

identifying metadata in an external data structure separate from the document text using the identifier, the external data structure storing metadata corresponding to a plurality of documents;

comparing the metadata to the document, the comparing comprising:

analyzing the document text of the document and a layout of the document to determine information about the document; and comparing the information about the document to the metadata to determine whether the information and metadata match; and responsive to the comparing of the metadata to the document, performing one of:

if the comparing indicates that the information and the metadata match, associating the metadata with the document; and if the comparing indicates that the information and the metadata do not match, storing an indication that additional processing is needed, where the additional processing includes manual identification of the document identifier or manual identification of the metadata.

16. The system of claim 15, wherein locating an identifier of the document comprises finding an International Standard Book Number (ISBN) in the document.

17. The system of claim 16, wherein locating an identifier of the document further comprises:

locating a barcode in the document;

determining whether the barcode matches the ISBN; and responsive to determining that the barcode matches the ISBN, indicating that the correct identifier has been located.

18. The system of claim 15, the steps further comprising making the information available for keyword searching responsive to the comparing of the information about the document to the metadata indicating that the information and the metadata match.

19. The system of claim 15, wherein comparing the metadata to the document further comprises comparing at least one of a title, a name of author, or a name of publisher.

20. The system of claim 15, wherein identifying metadata in an external data structure comprises:

accessing a metadata database storing information regarding the plurality of documents gathered from a plurality of sources.

\* \* \* \* \*